(12) United States Patent (10) Patent No.: US 12,382,292 B2
Mishra et al. (45) Date of Patent: Aug. 5, 2025

(54) MITIGATION OF ROGUE Wi-Fi 6E COMPATIBLE ACCESS POINTS

(71) Applicant: Fortinet, Inc., Sunnyvale, CA (US)

(72) Inventors: Ruchir Mishra, Sunnyvale, CA (US); Shrikant Gambheer Patil, Sunnyvale, CA (US)

(73) Assignee: Fortinet, Inc., Sunnyvale, CA (US)

( * ) Notice: Subject to any disclaimer, the term of this patent is extended or adjusted under 35 U.S.C. 154(b) by 63 days.

(21) Appl. No.: 18/092,309

(22) Filed: Dec. 31, 2022

(65) Prior Publication Data

US 2024/0214813 A1 Jun. 27, 2024

Related U.S. Application Data

(63) Continuation-in-part of application No. 18/088,980, filed on Dec. 27, 2022.

(51) Int. Cl.
*H04W 12/122* (2021.01)
*H04W 24/08* (2009.01)

(52) U.S. Cl.
CPC ......... *H04W 12/122* (2021.01); *H04W 24/08* (2013.01)

(58) Field of Classification Search
CPC ............................ H04W 12/122; H04W 24/08
USPC .......................................................... 726/26
See application file for complete search history.

(56) References Cited

U.S. PATENT DOCUMENTS

2015/0257026 A1 9/2015 Muttik
2022/0030665 A1* 1/2022 Nakanishi ............... H04W 8/26

\* cited by examiner

*Primary Examiner* — Lan Dai T Truong
(74) *Attorney, Agent, or Firm* — Law Office of Dorian Cartwright; Dorian Cartwright

(57) ABSTRACT

A rogue Wi-Fi 6E access points are identified by on-wire data traffic of authorized Wi-Fi 6E access points. Data traffic is monitored across all access points for the rogue Wi-Fi 6E access points according to an SSID/BSSID scan table. In response, modified CSA values are sent from spoofed action frames that have a source BSSID of the rogue access points rather than the authenticated access point that transmits.

7 Claims, 6 Drawing Sheets

MITIGATION OF ROGUE Wi-Fi 6E COMPATIBLE ACCESS POINTS

CROSS-REFERENCE TO RELATED APPLICATIONS

This application claims priority as a continuation-in-part under 35 USC 120 to commonly-owned U.S. application. Ser. No. 18/088,980, filed Dec. 27, 1922, and titled MACHINE LEARNING DYNAMIC RADIO SIGNAL STRENGTH INDICATOR (RSSI) THRESHOLD FOR MANAGING CONNECTIONS WITH WI-FI 6E CLIENTS, the contents of which are hereby incorporated in its entirety.

FIELD OF THE INVENTION

The invention relates generally to computer networks, and more specifically, to wirelessly managing connections with Wi-Fi 6E clients, for coordinated channel switch announcement (CSA) disruption of rogue Wi-Fi 6E access point connections with Wi-Fi 6E stations.

BACKGROUND

In convention Wi-Fi deployments, rogue access points use SSIDs of authenticated access points in a private network for malicious connections to stations. Typically, authenticated access points can flood rogue access points with deauthentication frames to rogue stations. However, with the advent of Wi-Fi 6E, the deauthentication is not effective because the rogue station can simply reconnect at the 5 GHz or 2.4 GHz band.

Similarly, using probe response frames in response to probe request frames from the station cannot be used to prevent connections from rogue access points to rogue station in Wi-Fi 6E because the probe request-probe response protocol is not used for connections.

What is needed is a robust technique for coordinated CSA disruption of rogue Wi-Fi 6E access point connections with Wi-Fi 6E stations. For example, a first access point sets up CSA remediation for a second access point from a centralized Wi-Fi controller.

SUMMARY

To meet the above-described needs, methods, computer program products, and systems for wirelessly managing connections with Wi-Fi 6E clients, for coordinated CSA disruption of rogue Wi-Fi 6E access point connections with Wi-Fi 6E stations.

In one embodiment, rogue Wi-Fi 6E access points are identified by on-wire data traffic of authorized Wi-Fi 6E access points. Data traffic is monitored across all access points for the rogue Wi-Fi 6E access points according to table of service set identifiers and associated basic service set identifiers, or an SSID/BSSID scan table. In response, modified CSA values are sent from spoofed action frames that have a source BSSID of the rogue access points rather than the authenticated access point that transmits.

In another embodiment, authorized Wi-Fi 6E access points are identified from on-wire monitoring. The on-wire monitoring of SSID/BSSID data can include a channel occupied for Wi-Fi traffic. A SSID/BSSID scan table of on-wire SSID/BSSID combinations of the Wi-Fi 6E access points is generated and maintained. The Wi-Fi monitoring of SSID/BSSID data can include a channel occupied for Wi-Fi traffic, from RF scanning by the authorized Wi-Fi 6E access points managed over wire by the Wi-Fi controller. The rogue Wi-Fi access point is detected from an unregistered BSSID combined with a registered SSID within RF range of a first Wi-Fi 6E access point from the SSID/BSSID scan table.

In still another embodiment, at a subsequent time, the rouge access point is detected from the unregistered BSSID within range of a second Wi-Fi 6E access point, physically distinct from the first Wi-Fi 6E access point, communicating with a Wi-Fi 6E access point. The SSID/BSSID data for the rogue Wi-Fi 6E access point is transmitted from the scan table to the second Wi-Fi 6E access point for disrupting. In response to the transmission, the second Wi-Fi 6E access point generates an action frame modified with a spoofed BSSID associated with the rogue access point as scanned by the first Wi-Fi 6E access point, and including a channel switch announcement (CSA) values, causing the Wi-Fi 6E station to change a channel used to communicate with the rogue Wi-Fi 6E access point.

Advantageously, network performance and computer performance are improved with better network security.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for wirelessly managing connections with Wi-Fi 6E clients, for access to a backbone network, based on a machine learning dynamic RSSI threshold. One of ordinary skill in the art will recognize many alternative embodiments that are not explicitly listed based on the following disclosure.

I. Systems for Coordinated Wi-Fi 6E CSA Disruption (FIGS. 1-2)

Figure 1:
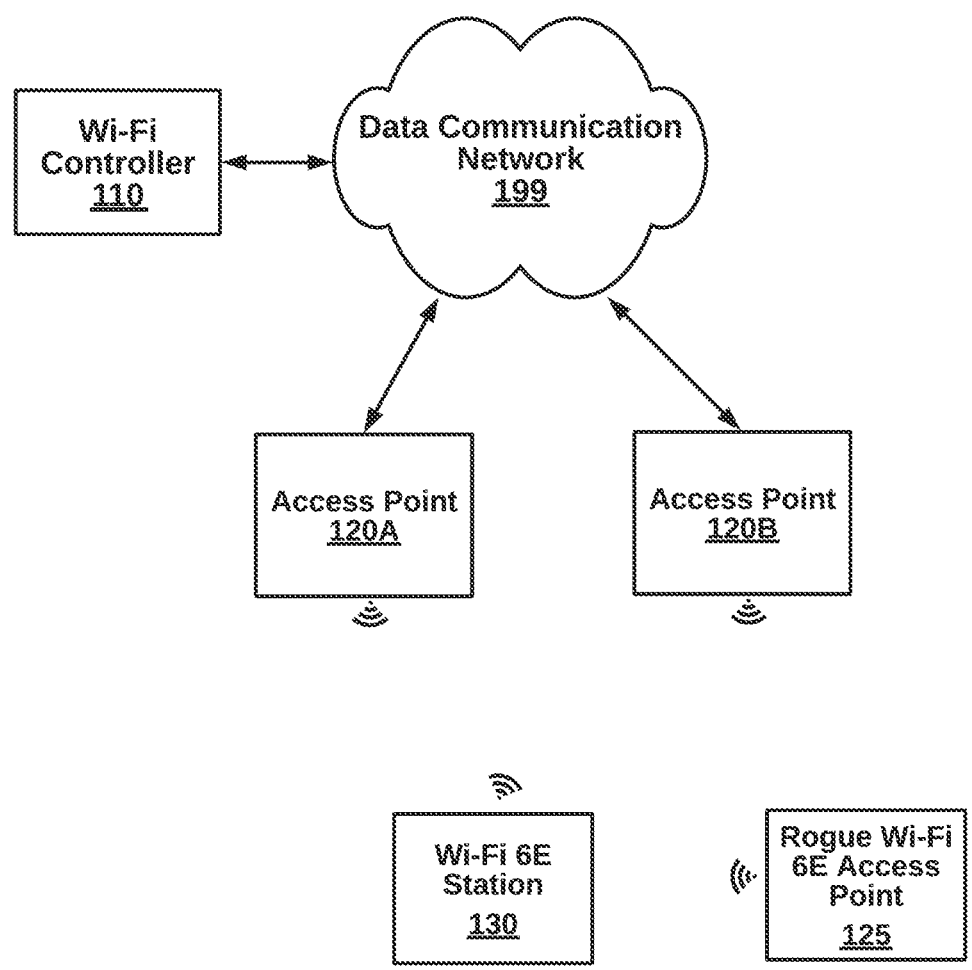
FIG. 1 is a high-level block diagram illustrating a system for coordinated CSA disruption of rogue Wi-Fi 6E access point connections with Wi-Fi 6E stations, according to one embodiment.
Figures 2, 3A, 3B:
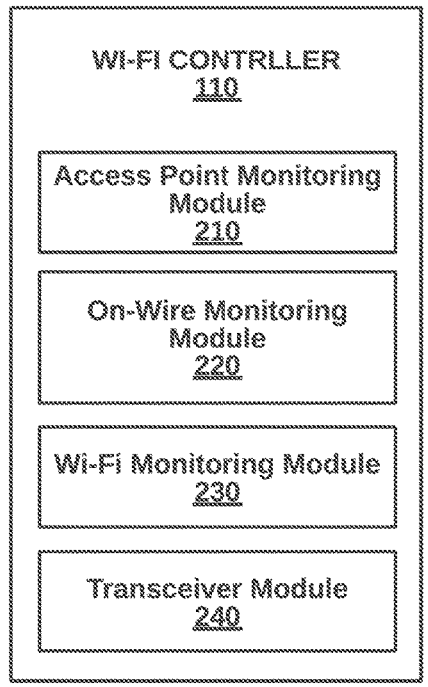
FIG. 2 is a more detailed block diagram illustrating an access point of the system of FIG. 1, according to one embodiment.
FIG. 3A is a block diagram illustrating a management action frame with CSA parameters, according to an embodiment.
FIG. 3B is a block diagram illustrating a CSA element according to an embodiment.

FIG. 1 is a high-level block diagram illustrating a system 100 for wirelessly managing connections with Wi-Fi 6E clients, for coordinated CSA disruption of rogue Wi-Fi 6E access point connections with Wi-Fi 6E stations, according to one embodiment. The system 100 includes a Wi-Fi controller 110, authorized Wi-Fi 6E access points 110A, B and Wi-Fi 6E client 130. Other embodiments of the system 100 can include additional components that are not shown in FIG. 1, such as controllers, network gateways, firewalls, and additional access points and stations. The components can be implemented in hardware and/or software, such as the example detailed below with respect to FIG. 7.

In one embodiment, the components of the system 100 are coupled in communication over a private network connected to a public network, such as the Internet. In another embodiment, system 100 is an isolated, private network. The components can be connected to the data communication system 199 via wire (e.g., Wi-Fi controller 110, and authorized Wi-Fi 6E access points 120A, B) and via wireless channels (e.g., client 130). The data communication network can be composed of any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802, 11r, 802.11be, Wi-Fi 6, Wi-Fi 6E, Wi-Fi 7 and the like. Components can use IPv4 or IPv6 address spaces.

The Wi-Fi controller 110 analyses data from multiple access points on a private network to identify rogue access points and respond with directions for CSA modifications in spoofed data packets sent from the access points 120A, B. Data can be initially gathered by enabling scanning around a private network at different access points. Scanning can be coordinated such that scanning access points are dispersed in time and location to maintain optimum RF coverage.

A rogue access point 125 usus WI-Fi 6E and is identified by the Wi-Fi controller 110 during scanning by an access point under management of the Wi-Fi controller 110. It is determined to be rogue because its hardware unique identifier does not match the on-wire hardware identifiers being sensed from authorized access points. For example, a MAC address or BSSID address of the rogue access point 125 cannot be found on a table maintained from on-wire traffic, while using an SSID that is part of the on-wire traffic. In one embodiment, a rule identifies an access point as a rogue access point responsive to using a registered SSID from an unregistered BSSID. A rule identifies an access point as a benign, neighbor access point responsive to using an unregistered SSID from an unregistered BSSID. By using the registered SSID, the rogue access point 125 is disguised as the private network to connected stations. This may cause connected stations to share sensitive data outside the actual private network. The neighbor access point is characterized as benign because no proprietary, registered SSID or BSSID is in use.

In other operations, the Wi-Fi controller 110 manages the Wi-Fi 6E access points 120A, B. Security policies can be uniformly applied among different access points. Additionally, stations can be continuously tracked while roaming to different access points. The Wi-Fi controller 110, in an embodiment, has a wired connection to the access points 110A and 110B.

The Wi-Fi 6E access points 120A, B provide connections to the backbone network for Wi-Fi 6E client 130 and others wireless network devices. In a scan mode, the Wi-Fi access point radios listen for data packets using the BSSID/SSID scan table maintained by the Wi-Fi controller 110.

The Wi-Fi 6E access points 120A, B can be a self-contained hardware box, multiple devices, or a virtual access point, without limitation. Wireless transmissions can be at 2.4 GHZ, 5 GHz or 6 GHz, for example.

The Wi-Fi 6E client 130 can be capable of Wi-Fi 6E communications as well as legacy communication standards such as Wi-Fi 5 and emerging communication standards such as Wi-Fi 7. Stations respond to beacons sent out by access points advertising services. Once authenticated and associated, data packets can be wirelessly exchanged within the network.

FIG. 2 is a more detailed block diagram illustrating the Wi-Fi controller 110 of the system of FIG. 1, according to one embodiment. The Wi-Fi controller 110 includes an access point monitoring module 210, an on-wire monitoring module 220, a Wi-Fi monitoring module 230, and a transceiver module 240. The components can be implemented in hardware, software, or a combination of both.

The access point monitoring module 210 can identify authorized Wi-Fi 6E access points. For example, an operating system registers the access points and can provide a list.

The on-wire monitoring module 220 tracks SSID/BSSID data including a channel occupied for Wi-Fi traffic, from radio frequency (RF) scanning by the authorized Wi-Fi 6E access points managed over wire by the Wi-Fi controller. The BSSID or MAC address of an access point uniquely identifies, at layer 2, a radio card for network interface hardware, such as the MAC card, with a 48-character hexadecimal number. The BSSID may be assigned by the manufacturer and persists through the hardware lifetime. The SSID is unique to a WLAN as a virtual designation of a network service with alphanumeric characters. The SSID can involve different hardware (e.g., multiple access points use common SSID) and can be updated.

The Wi-Fi monitoring module 230 tracks SSID/BSSID data including channel occupied for Wi-Fi traffic. The Wi-Fi data packets are encapsulated within on-wire data packets for transmission from the Wi-Fi access points to the Wi-Fi controller. Thus, an on-wire data packet can have an SSID/BSSID while transporting a Wi-Fi data packet having an SSID/BSSID of the rogue access point 125. If the packet was transmitted by the rogue access point 125, a source field includes an SSID/BSSID of the rogue access point 125. If the packet was transmitted by the client 130, a destination field includes at least the SSID/SSID of the rouge access point 125, in part or in whole.

The access point monitoring module 210 detects the rogue Wi-Fi access point from an unregistered BSSID combined with a registered SSID within RF range of a first Wi-Fi 6E access point from the SSID/BSSID scan table. A neighboring Wi-Fi access point can be detected from an unregistered BSSID combined with an unregistered SSID. An SSID/BSSID scan table of on-wire SSID/BSSID combinations of the Wi-Fi 6E access points is generated and maintained.

The access point monitoring module 210, at a subsequent time, detects the rogue access point from the unregistered BSSID within range of a second Wi-Fi 6E access point, physically distinct from the first Wi-Fi 6E access point, communicating with a Wi-Fi 6E station.

The access point monitoring module 210 can utilize the transceiver module 240 to transmit the SSID/BSSID data for the rogue Wi-Fi 6E access point from the scan table to the second Wi-Fi 6E access point for disruption. In response to the transmission, the second Wi-Fi 6E access point generates an action frame modified for the Wi-Fi 6E station with a spoofed BSSID associated with the rogue Wi-Fi access point as scanned by the first Wi-Fi 6E access point, and including CSA values, causing the Wi-Fi 6E station to change a channel used to communicate with the rogue Wi-Fi 6E access point.

II. Methods for Coordinated CSA Disruption (FIGS. 4-6)

Figure 4:
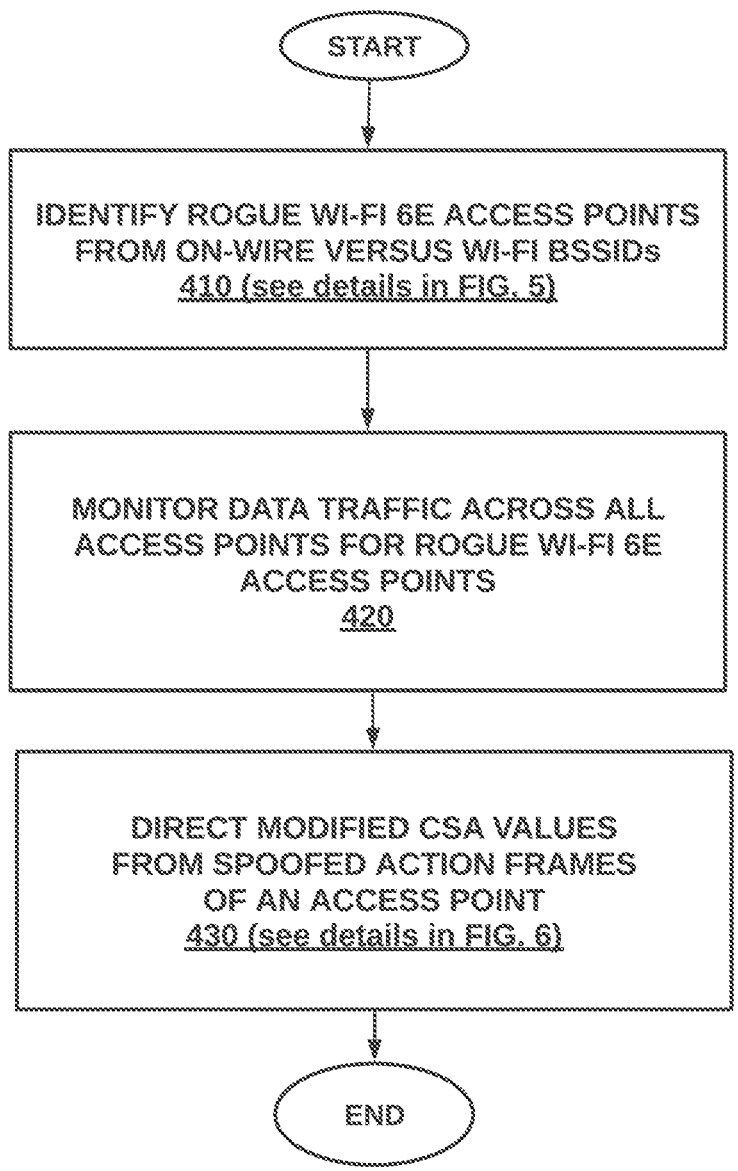
FIG. 4 is a high-level flow diagram illustrating a method for coordinated CSA disruption of rogue Wi-Fi 6E access point connections with Wi-Fi 6E stations, according to one embodiment.

FIG. 4 is a high-level flow diagram illustrating a method 400 for coordinated channel CSA disruption of rogue Wi-Fi 6E access point connections with Wi-Fi 6E stations, according to one embodiment. The method 300 can be implemented by, for example, system 100 of FIG. 1.

Figure 5:
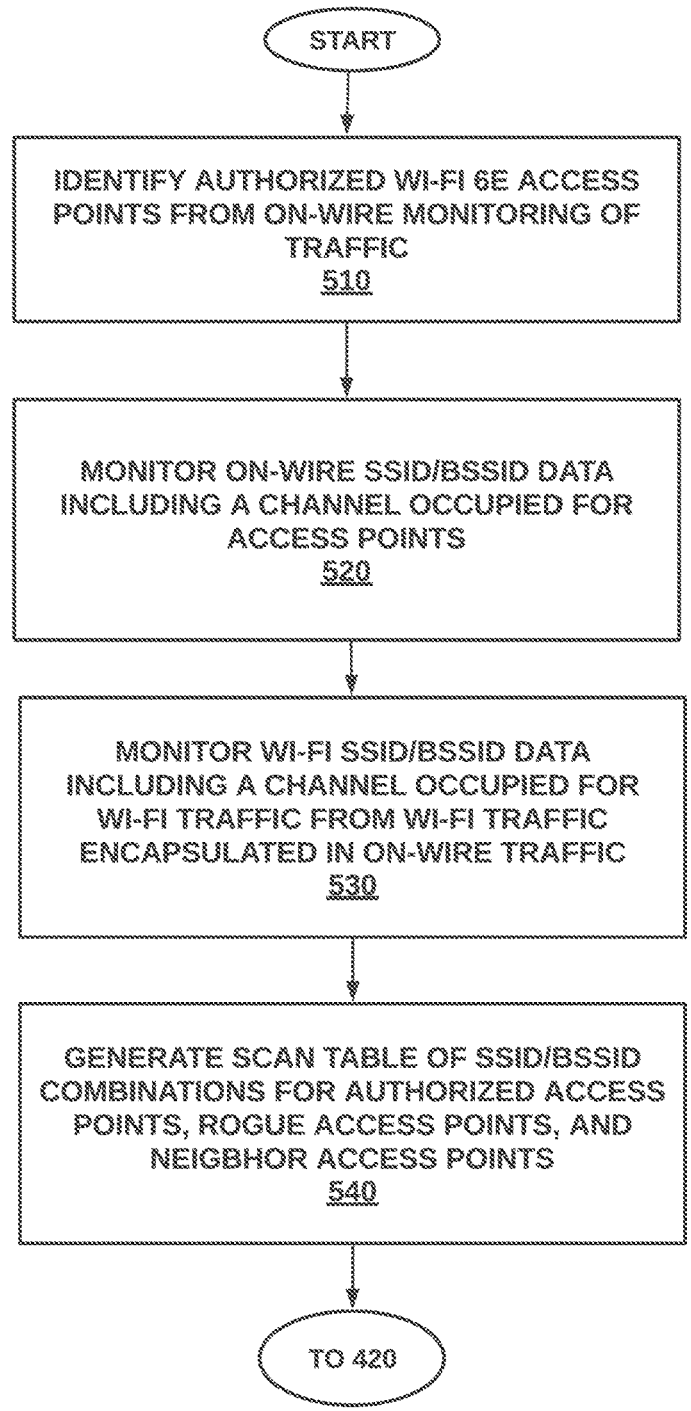
FIG. 5 is a more detailed flow diagram illustrating a step of identifying rogue Wi-Fi 6E access points by on-wire data traffic, from the method of FIG. 4, according to an embodiment.
Figure 6:
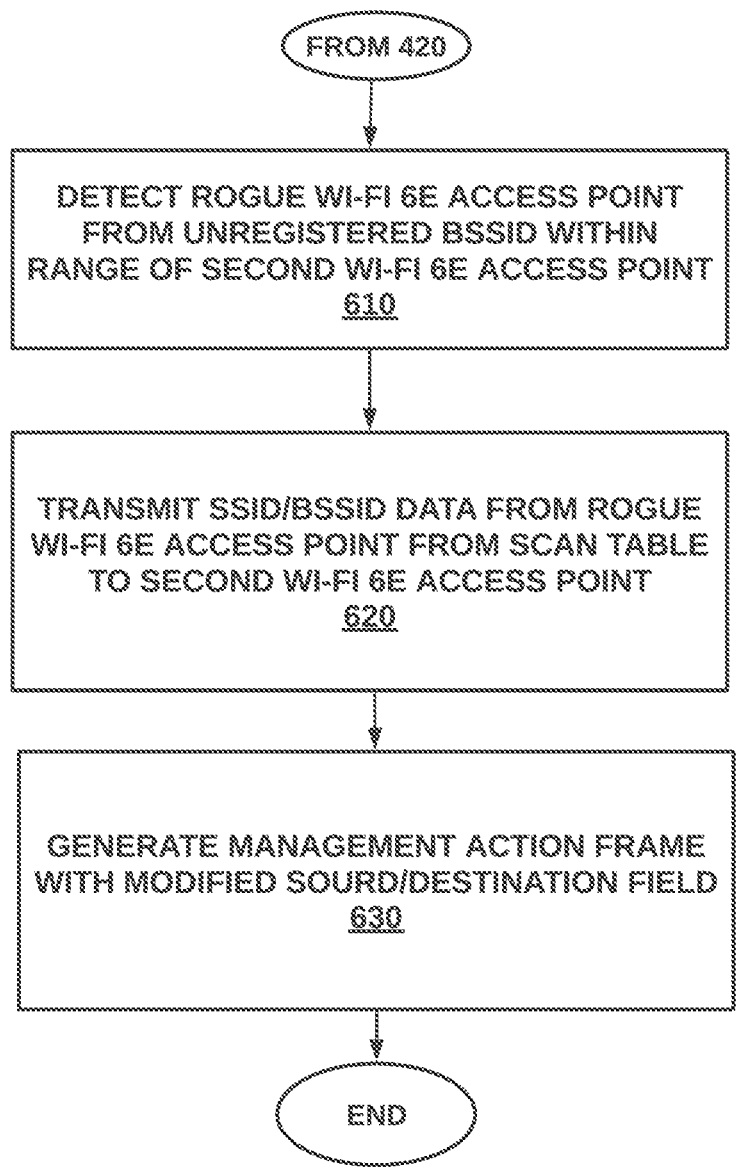
FIG. 6 is a more detailed flow diagram illustrating a step of sent modified CSA values from spoofed action frames, from the method of FIG. 4, according to an embodiment.

A step 410, rogue Wi-Fi 6E access points are identified by on-wire data traffic of authorized Wi-Fi 6E access points, as described in FIG. 5. At step 420, data traffic is monitored across all access points for the rogue Wi-Fi 6E access points according to an SSID/BSSID scan table. In response, at step 430, modified CSA values are sent from spoofed action frames, as detailed in FIG. 6

Turning to FIG. 5. at step 510, authorized Wi-Fi 6E access points are identified. At step 520, on-wire monitoring of SSID/BSSID data including a channel occupied for Wi-Fi traffic. At step 530, Wi-Fi monitoring of SSID/BSSID data including channel occupied for Wi-Fi traffic, from RF scanning by the authorized Wi-Fi 6E access points managed over wire by the Wi-Fi controller. The Wi-Fi data packets are encapsulated within on-wire data packets for transmission from the Wi-Fi access points to the Wi-Fi controller. At step 540, an SSID/BSSID scan table is generated and maintained. The rogue Wi-Fi access point can be detected from an unregistered BSSID combined with a registered SSID within RF range of a first Wi-Fi 6E access point from the SSID/BSSID scan table.

As shown in FIG. 6, at step 610, the rogue access point is detected from the unregistered BSSID within range of a second Wi-Fi 6E access point, physically distinct from the first Wi-Fi 6E access point, communicating with a Wi-Fi 6E station.

At step 620, the SSID/BSSID data for the rogue Wi-Fi 6E access point is transmitted from the scan table to the second Wi-Fi 6E access point for disruption. In response to the transmission, at step 630, the second Wi-Fi 6E access point generates an action frame modified for the Wi-Fi 6E station with a spoofed BSSID associated with the rogue Wi-Fi 6E access point as scanned by the first Wi-Fi 6E access point, and including CSA values, causing the Wi-Fi 6E station to change a channel used to communicate with the rogue Wi-Fi 6E access point.

A management action frame 310 is shown in FIG. 3A. The fields include a user information field 310 and a common information field 320. A CSA element 320 of 3B indicates what channel to switch to.

III. Computing Device for Coordinated CSA Disruption (FIG. 7)

Figure 7:
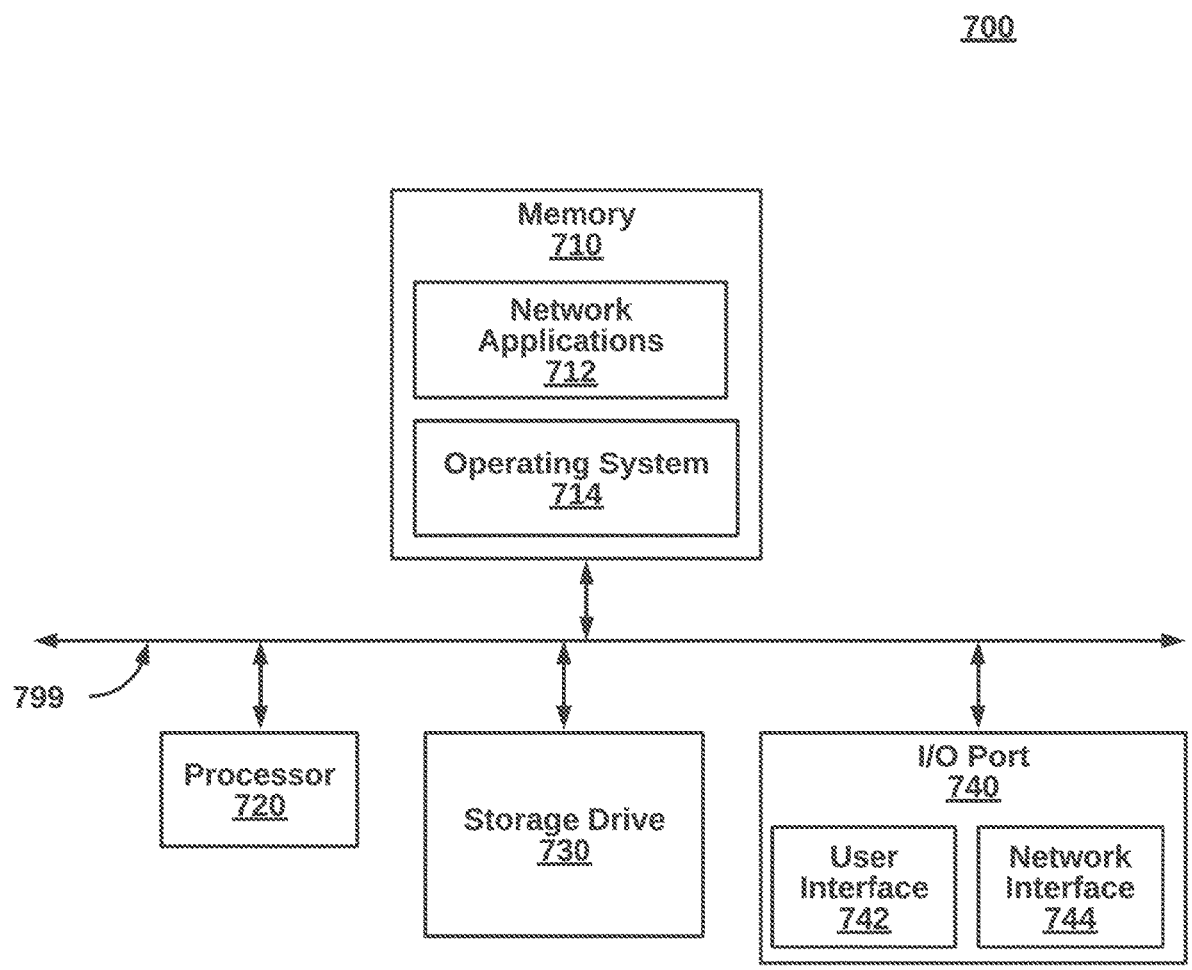
FIG. 7 is a block diagram illustrating an example computing device for the system of FIG. 1, according to one embodiment.

FIG. 7 is a block diagram illustrating a computing device 700 for use in the system 100 of FIG. 1, according to one embodiment. The computing device 700 is a non-limiting example device for implementing each of the components of the system 100, including Wi-Fi controller 110, Wi-Fi 6E access points 120A, B, and client 130. Additionally, the computing device 700 is merely an example implementation itself, since the system 100 can also be fully or partially implemented with laptop computers, tablet computers, smart cell phones, Internet access applications, and the like.

The computing device 700, of the present embodiment, includes a memory 710, a processor 720, a hard drive 730, and an I/O port 740. Each of the components is coupled for electronic communication via a bus 799. Communication can be digital and/or analog, and use any suitable protocol.

The memory 710 further comprises network access applications 712 and an operating system 714. Network access applications can include 712 a web browser, a mobile access application, an access application that uses networking, a remote access application executing locally, a network protocol access application, a network management access application, a network routing access applications, or the like.

The operating system 714 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 720 can be a network processor (e.g., optimized for IEE 802.11), a general-purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEE 802.11 devices. The processor 720 can be single core, multiple core, or include more than one processing elements. The processor 720 can be disposed on silicon or any other suitable material. The processor 720 can receive and execute instructions and data stored in the memory 710 or the hard drive 730.

The storage device 730 can be any non-volatile type of storage such as a magnetic disc, EPROM, Flash, or the like. The storage device 730 stores code and data for access applications.

The I/O port 740 further comprises a user interface 742 and a network interface 744. The user interface 742 can output to a display device and receive input from, for example, a keyboard. The network interface 744 connects to a medium such as Ethernet or Wi-Fi for data input and output. In one embodiment, the network interface 744 includes IEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

We claim:

1. In a Wi-Fi controller, a method for coordinated channel switch announcement (CSA) disruption of rogue Wi-Fi 6E access point connections with Wi-Fi 6E stations, the method comprising:
    identifying authorized Wi-Fi 6E access points;
    on-wire monitoring of SSID/BSSID data including a channel occupied for Wi-Fi traffic, and generating an SSID/BSSID scan table of on-wire SSID/BSSID combinations of the Wi-Fi 6E access points;
    Wi-Fi monitoring of SSID/BSSID data including channel occupied for Wi-Fi traffic, from RF scanning by the authorized Wi-Fi 6E access points managed over wire by the Wi-Fi controller, wherein the Wi-Fi data packets are encapsulated within on -wire data packets for transmission from the Wi-Fi 6E access points to the Wi-Fi controller;
    detecting the rogue Wi-Fi access point from an unregistered BSSID combined with a registered SSID within RF range of a first Wi-Fi 6E access point from the SSID/BSSID scan table;
    at a subsequent time, detecting the rogue access point from the unregistered BSSID within range of a second Wi-Fi 6E access point, physically distinct from the first Wi-Fi 6E access point, communicating with a Wi-Fi 6E station; and
    transmitting the SSID/BSSID data for the rogue Wi-Fi 6E access point from the SSID/BSSID scan table to the second Wi-Fi 6E access point for disruption, wherein, in response to the transmission, the second Wi-Fi 6E access point generates an action frame modified for the Wi-Fi 6E station with a spoofed BSSID associated with the rogue Wi-Fi access point as scanned by the first Wi-Fi 6E access point, and including CSA values, causing the Wi-Fi 6E station to change a channel used to communicate with the rogue Wi-Fi 6E access point.

2. The method of claim 1, further comprising:
    at a second subsequent time, detecting a neighboring access point from an unregistered BSSID combined with a unregistered SSID within range of the first Wi-Fi access point,
    wherein no action frame is generated based on the detection.

3. The method of claim 1, further comprising:
    enabling a suppress rogue access points mode at the Wi-Fi controller.

4. The method of claim 1, further comprising:
    enabling a suppress rogue access points mode at the first and second Wi-Fi 6E access points.

5. The method of claim 1, wherein a second Wi-Fi 6E station generates a second modified action fame with an updated, modified CSA value.

6. A non-transitory computer-readable medium in a Wi-Fi controller, at least partially implemented in hardware, storing instructions that, when executed by a processor, perform a computer -implemented method for coordinated channel CSA disruption of rogue Wi-Fi 6E access point connections with Wi-Fi 6E stations, the method comprising:
    an access point tracking module identifying authorized Wi-Fi 6E access points;
    an on-wire monitoring module to monitor SSID/BSSID data including a channel occupied for Wi-Fi traffic from on-wire data traffic, and generate an SSID/BSSID scan table of on-wire SSID/BSSID combinations of the Wi-Fi 6E access points;

a Wi-Fi monitoring module to monitor Wi-Fi traffic for SSID/BSSID data including channel occupied for Wi-Fi traffic, from RF scanning by the authorized Wi-Fi 6E access points managed over wire by the Wi-Fi controller, wherein Wi-Fi data packets are encapsulated within on-wire data packets for transmission from the Wi-Fi access points to the Wi-Fi controller;

wherein the access point tracking module detects the rogue Wi-Fi access point from an unregistered BSSID combined with a registered SSID within RF range of a first Wi-Fi 6E access point from the SSID/BSSID scan table, wherein at a subsequent time, the access point tracking module detects the rogue Wi-Fi 6E access point from the unregistered BSSID within range of a second Wi-Fi 6E access point, physically distinct from the first Wi-Fi 6E access point, communicating with a Wi-Fi 6E station;

transmitting the SSID/BSSID data for the rogue Wi-Fi 6E access point from the scan table to the second Wi-Fi 6E access point for disruption, wherein, in response to the transmission, the second Wi-Fi 6E access point generates an action frame modified for the Wi-Fi 6E station with a spoofed BSSID associated with the rogue Wi-Fi access point as scanned by the first Wi-Fi 6E access point, and including CSA values, causing the Wi-Fi 6E station to change a channel used to communicate with the rogue Wi-Fi 6E access point.

7. A Wi-Fi 6E controller, at least partially implemented in hardware, for coordinated channel CSA disruption of rogue Wi-Fi 6E access point connections with Wi-Fi 6E stations, Wi-Fi 6E controller comprising: a processor; a network interface communicatively coupled to the processor and to a WLAN; and a memory, communicatively coupled to the processor and storing:

identifying authorized Wi-Fi 6E access points;

an access point tracking module identifying authorized Wi-Fi 6E access points;

an on-wire monitoring module to monitor of SSID/BSSID data including a channel occupied for Wi-Fi traffic from on-wire data traffic, and generate an SSID/BSSID scan table of on-wire SSID/BSSID combinations of the Wi-Fi 6E access points;

a Wi-Fi monitoring module to monitor Wi-Fi traffic for SSID/BSSID data including channel occupied for Wi-Fi traffic, from RF scanning by the authorized Wi-Fi 6E access points managed over wire by the Wi-Fi controller, wherein Wi-Fi data packets are encapsulated within on-wire data packets for transmission from the Wi-Fi 6E access points to the Wi-Fi controller;

wherein the access point tracking module detects the rogue Wi-Fi 6E access point from an unregistered BSSID combined with a registered SSID within RF range of a first Wi-Fi 6E access point from the SSID/BSSID scan table, wherein at a subsequent time, the access point tracking module detects the rogue access point from the unregistered BSSID within range of a second Wi-Fi 6E access point, physically distinct from the first Wi-Fi 6E access point, communicating with a Wi-Fi 6E station; and wherein the network interface transmits the SSID/BSSID data for the rogue Wi-Fi 6E access point from the SSID/BSSID scan table to the second Wi-Fi 6E access point for disruption, wherein, in response to the transmission, the second Wi-Fi 6E access point generates an action frame modified for the Wi-Fi 6E station with a spoofed BSSID associated with the rogue Wi-Fi access point as scanned by the first Wi-Fi 6E access point, and including CSA values, causing the Wi-Fi 6E station to change a channel used to communicate with the rogue Wi-Fi 6E access point.

* * * * *